May 1, 1951 A. J. BUSCH ET AL 2,550,909

RECORDING SYSTEM

Filed Sept. 4, 1947 7 Sheets-Sheet 1

| | | | | |
|---|---|---|---|---|
| FIG. 1 | FIG. 2 | FIG. 4 | | |
| | FIG. 3 | FIG. 5 | FIG. 6 | FIG. 7 |

INVENTORS A. J. BUSCH
E. VROOM

BY R. Marino

ATTORNEY

INVENTORS A. J. BUSCH
E. VROOM
BY R. Mariner
ATTORNEY

INVENTORS A. J. BUSCH
E. VROOM
BY R. Marino
ATTORNEY

INVENTORS A.J. BUSCH
E. VROOM
BY R. Marino
ATTORNEY

INVENTORS A.J. BUSCH
E. VROOM
BY R. Marino
ATTORNEY

RECORDING SYSTEM

Filed Sept. 4, 1947 7 Sheets-Sheet 6

PUNCH CONTROL CIRCUIT OF REGISTER NO. 54

INVENTORS A. J. BUSCH
E. VROOM
BY R. Marino
ATTORNEY

May 1, 1951 A. J. BUSCH ET AL 2,550,909

RECORDING SYSTEM

Filed Sept. 4, 1947 7 Sheets-Sheet 7

INVENTORS A.J. BUSCH
E. VROOM
BY R. Marino
ATTORNEY

Patented May 1, 1951 2,550,909

UNITED STATES PATENT OFFICE 2,550,909

RECORDING SYSTEM

Aloysius J. Busch, Madison, N. J., and Edward Vroom, Ossining, N. Y., assignors to Bell Telephone Laboratories, Incorporated, New York, N. Y., a corporation of New York Application September 4, 1947, Serial No. 772,078

10 Claims. (Cl. 164—115)

This invention pertains to recording systems and particularly to systems for assembling related items of recorded data. It is especially adapted to the assembling of items of data recorded in successive lines by punching, impressing, or embossing a tape, strip, or sheet but is also applicable to the assembling of data of any kind from a record that can be read or sensed by mechanical, electrical, or photometric devices.

A feature of the invention is the recording of assembled data on record cards which are adapted for use in well-known types of accounting machines.

Another feature of the invention is the recording of each group of assembled items on an individual card.

Another feature of the invention is the employment of a single recorder for recording all assembled items.

Still another feature of the invention is a means whereby unrelated items are retained until related items are found and each assembled group of related items recorded at one time.

These and other features of the invention will be apparent from the accompanying description, the appended claims, and the drawings, in which:

Figures 1, 8:
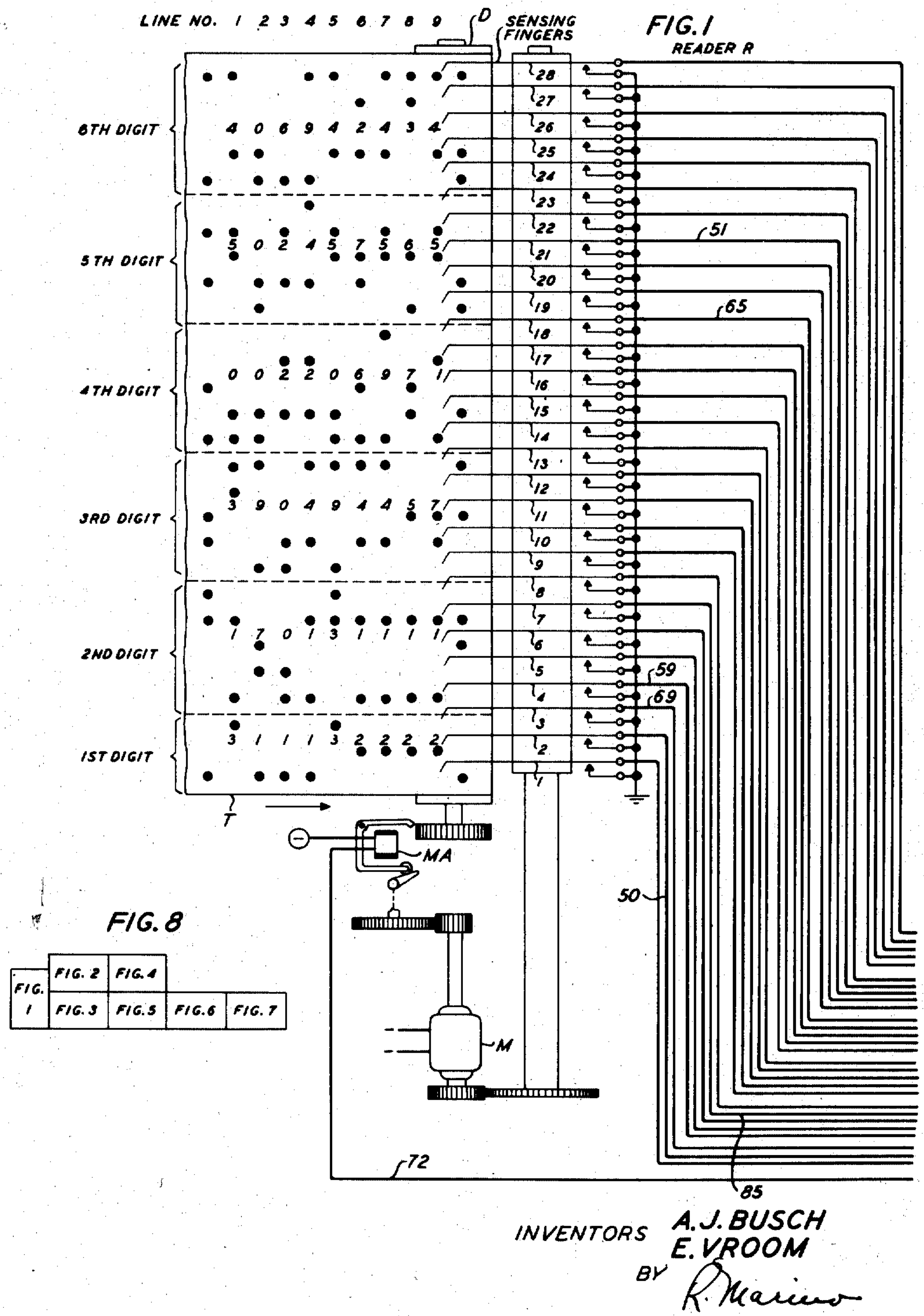
Fig. 1 shows diagrammatically a reader or sensing device and the record having the data to be assembled.
Fig. 8 shows how the above circuits should be placed in relation to one another to disclose the invention.
Figure 2:
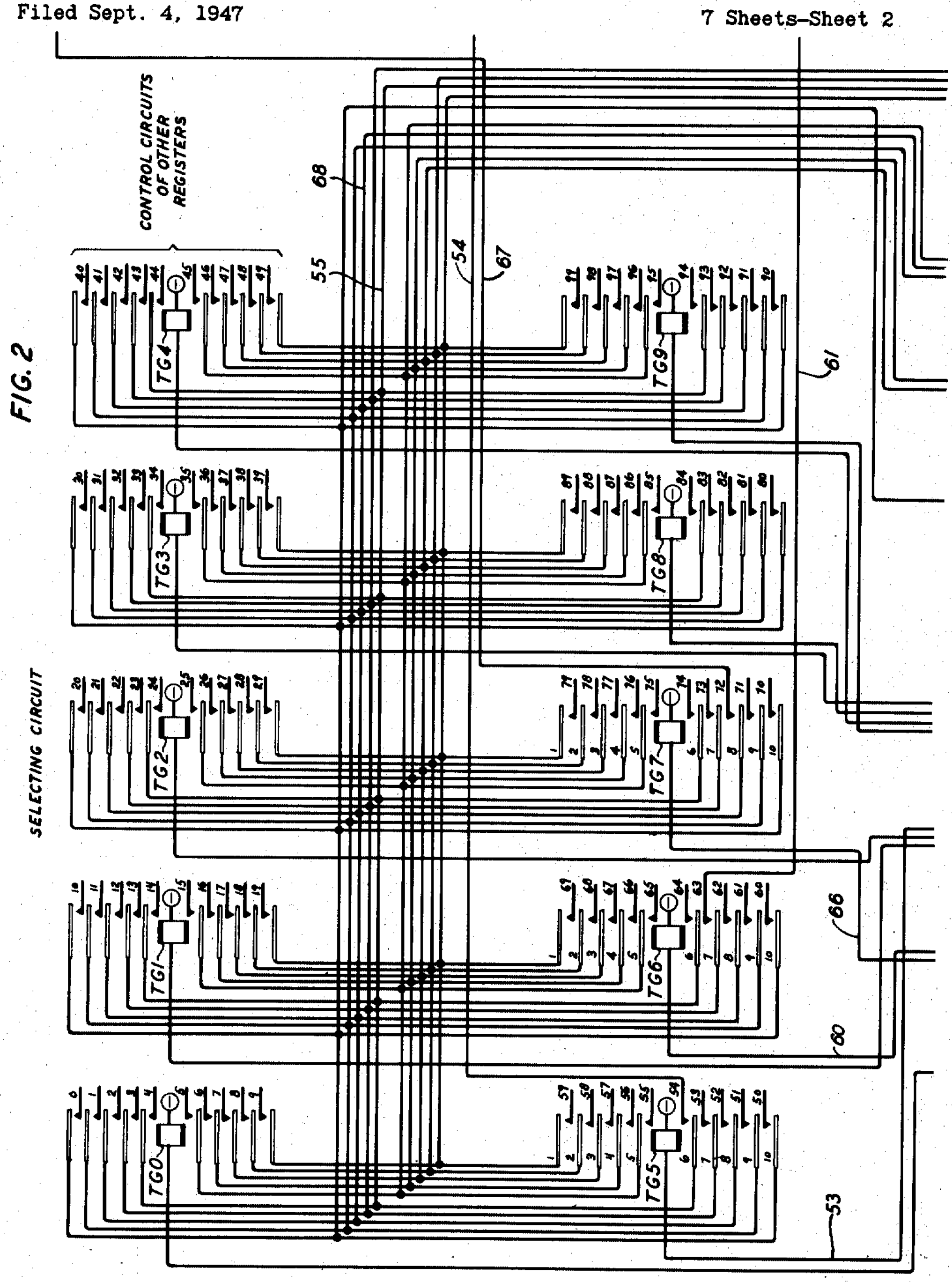
Fig. 2 shows the selecting circuit.
Figure 3:
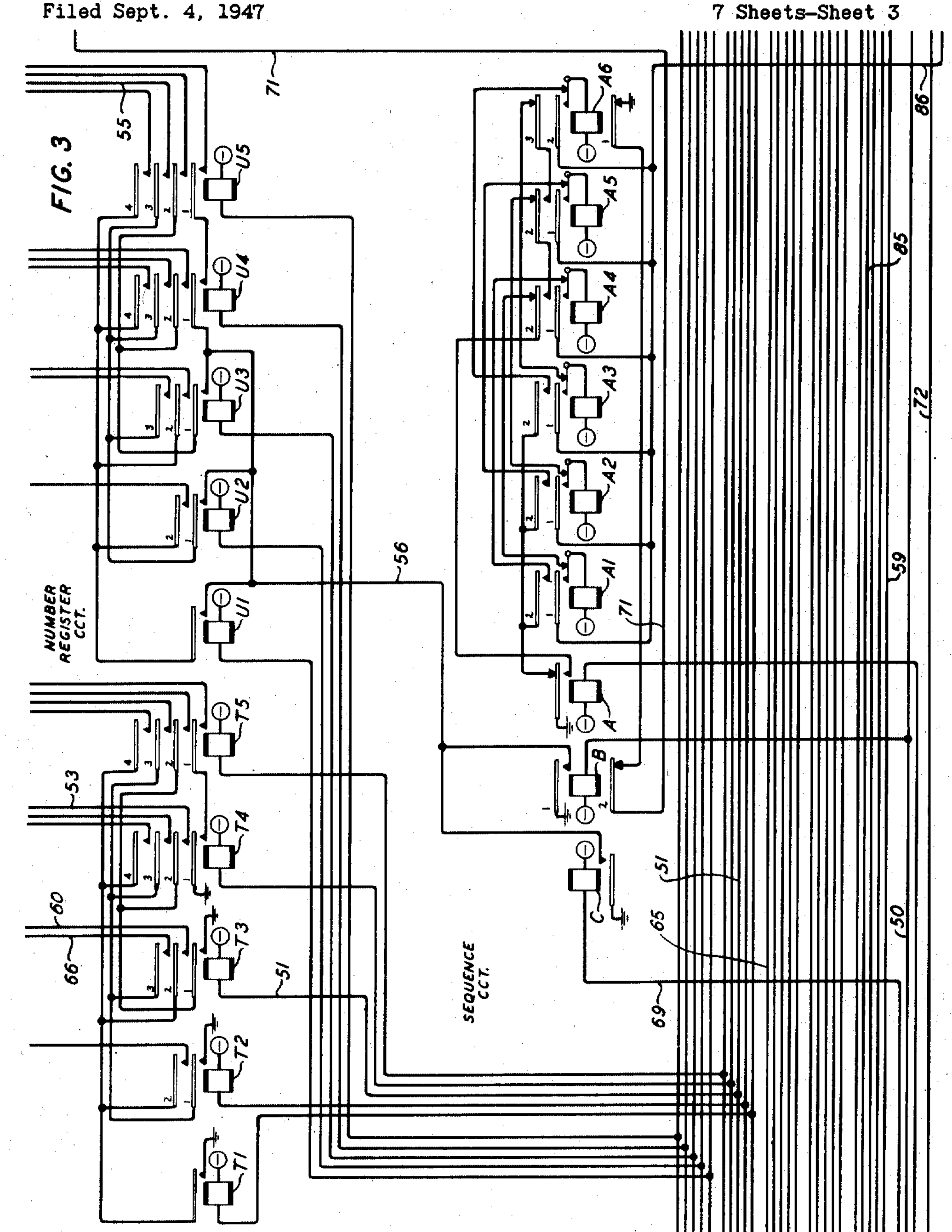
Fig. 3 shows the number register circuit and the sequence circuit.

The invention is illustrated by its application to the assembling of items of information relating to telephone calls recorded by successive lines of impressions in a paper tape. The copending application of W. W. Carpenter et al., Serial No. 759,402, filed July 7, 1947, discloses a telephone system in which items of information relating to telephone calls are recorded in random sequence by a recorder of the type disclosed in the copending application of W. W. Carpenter, Serial No. 588,401 filed April 14, 1945. This type of recorder comprises a row of punches which produce successive lines of indentations across a continuous paper tape. In the above system, when a telephone call is originated, an entry of four lines of indentations is made in which information relating to the origin and destination of said call is recorded. When the call is answered, an entry of one line is made indicating the time of answer, and a similar entry of one line, indicating the time of termination, is made when the connection is terminated. Between the first entry and the second entry and between the second entry and the third entry, entries relating to other calls may be recorded on the same tape. The entries relating to various calls are, therefore, interspersed on the tape. A portion of a record of this kind is illustrated in Fig. 1. In order to compute the charges to be made to the subscribers for the calls recorded, the three entries of each call must be assembled.

In each line of the record, one of the first three punches of the recorder is operated to produce an indentation which, by its position, indicates the character of the information contained in the remainder of the line. The first three lines of the initial entry of a call are each identified by an indentation produced by the first punch, as illustrated by lines Nos. 2, 3, and 4 of the record shown in Fig. 1. The last line of an initial entry is identified by an indentation produced by the third punch, as in line No. 5 of the record shown in Fig. 1. Each of the single-line entries of the answer or termination of calls is identified by an indentation produced by the second punch. This is illustrated by lines Nos. 1, 6, 7, 8 and 9 of the record shown in Fig. 1.

The other punches of the recorder are operated in combinations of two out of five adjacent punches to produce groups of indentations representing digits in accordance with the following code:

| Digit | Punches Operated in Group of Five Punches |
|---|---|
| 1 | 1st and 4th |
| 2 | 2nd and 4th |
| 3 | 4th and 5th |
| 4 | 2nd and 5th |
| 5 | 3rd and 4th |
| 6 | 1st and 3rd |
| 7 | 2nd and 3rd |
| 8 | 3rd and 5th |
| 9 | 1st and 5th |
| 0 | 1st and 2nd |

For a clearer understanding of the invention, the digit indicated by each group of indentations in lines 1 to 9 of the record of Fig. 1 is shown in the drawing.

The digits so recorded represent the pertinent information relating to the calls. In each entry, the last two digits recorded are the numbers of the trunk over which the call is made. For example, in the record shown in Fig. 1, lines Nos. 1, 7 and 9 are single-line entries relating to calls made over trunk No. 54 and line No. 5 is the last line of a four-line entry relating to a call made over the same trunk. All of these entries do not necessarily relate to the same call. Line No. 6 is an entry relating to a call made over trunk No. 72 and line No. 8 is an entry relating to a call made over trunk No. 63.

Since a trunk may be used only by one subscriber at one time the three entries relating to a single call may be recognized as three successive, but not necessarily consecutive, entries containing the same trunk number. For example, the entries of lines No. 5, No. 7 and No. 9 of the record shown in Fig. 1 relate to one call while the entry of line No. 1, although it contains the same trunk number, does not relate to said call.

In the present embodiment of the invention, the record from which the items are to be assembled is passed through a reader, shown diagrammatically in Fig. 1, of the type disclosed in the above-mentioned Carpenter application, Serial No. 588,401. In this type of reader, the record tape T is carried by a drum D. A series of sensing fingers, one for each position where an indentation may appear in a line of tape T, are alternately raised and lowered by a mechanism operated by motor M. A sensing finger encountering a depression in tape T, closes its associated contacts but sensing fingers which do not encounter depressions in tape T do not close their associated contacts. Each time the sensing fingers are raised, the drum D is normally partly turned by a mechanism operated by motor M, carrying forward the tape T, so that the sensing fingers successively fall on successive lines of the record on tape T. If, however, the arresting magnet MA is energized, the motion of drum D is arrested and the sensing fingers continue to fall on the same line of the record until magnet MA is deenergized. Reference may be had to the above-mentioned application for a more complete description of the construction and operation of a reader of this type.

Figure 7:
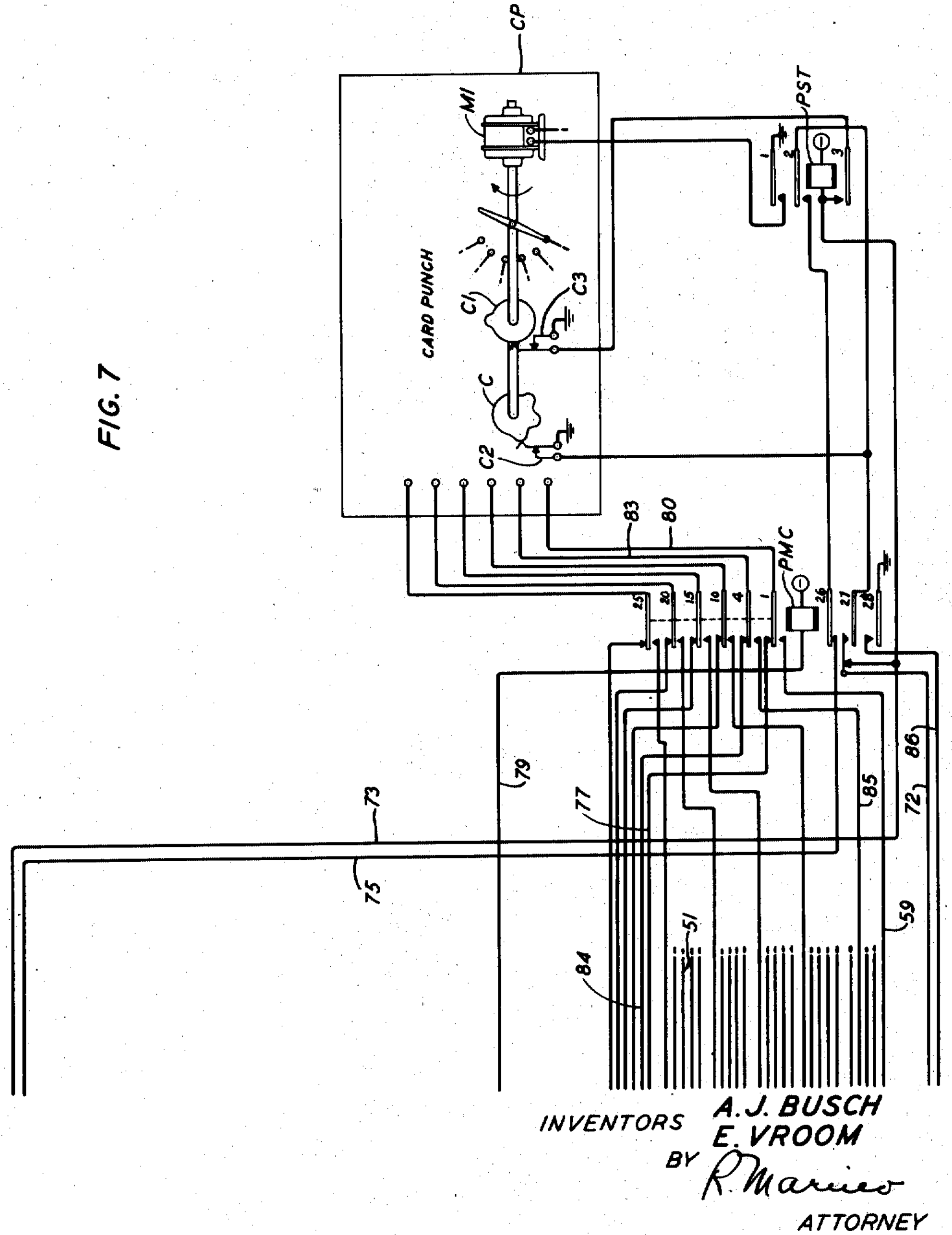
Fig. 7 shows schematically the card punch.

The card punch employed in the present embodiment of the invention and diagrammatically shown in Fig. 7 is a well-known type of machine adapted to produce, at each cycle of operations, an individual card punched with holes in successive lines. A commercially available machine of this type has a capacity of eighty holes in each of twelve lines. The holes punched by this machine are determined by the operation of selector magnets which may be electrically controlled to produce any desired combination of holes in each line. Reference may be had to the patent to T. L. Dowey et al., No. 2,263,291, dated November 18, 1941, for a more complete description of the construction and operation of a machine of this type.

To adapt the card punch to the present invention, the cams C and C1 in Fig. 7, mounted on the shaft of the machine, are provided. Lobes on cam C are arranged to close contacts C2 when the machine is in condition to punch each of the first three lines of a card. Cam C1 is arranged to open contacts C3 for a short time after the machine has ejected a completed card and to allow said contacts to remain closed at other times.

Figure 4:
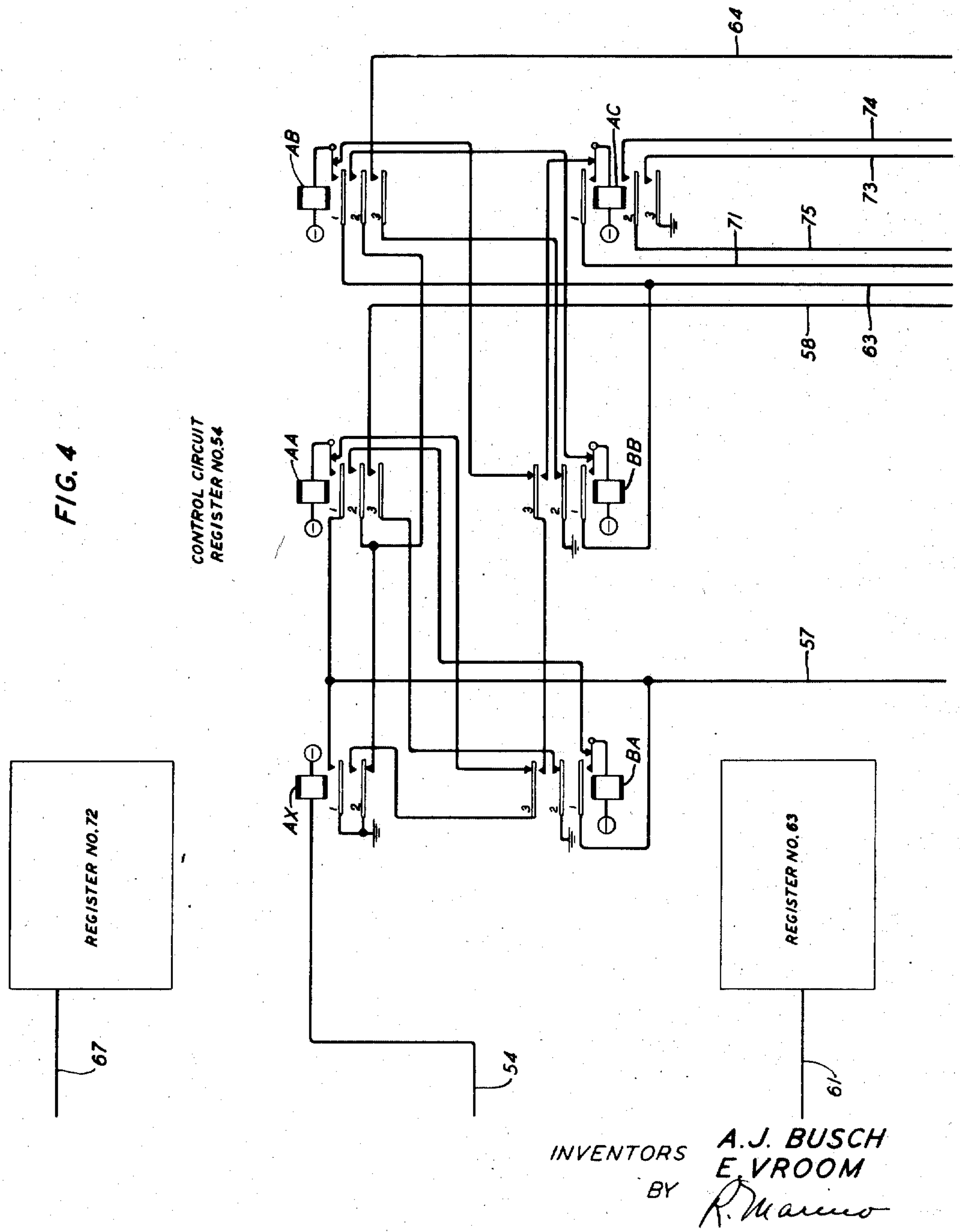
Fig. 4 shows the control circuit of one register and indicates other registers.
Figure 5:
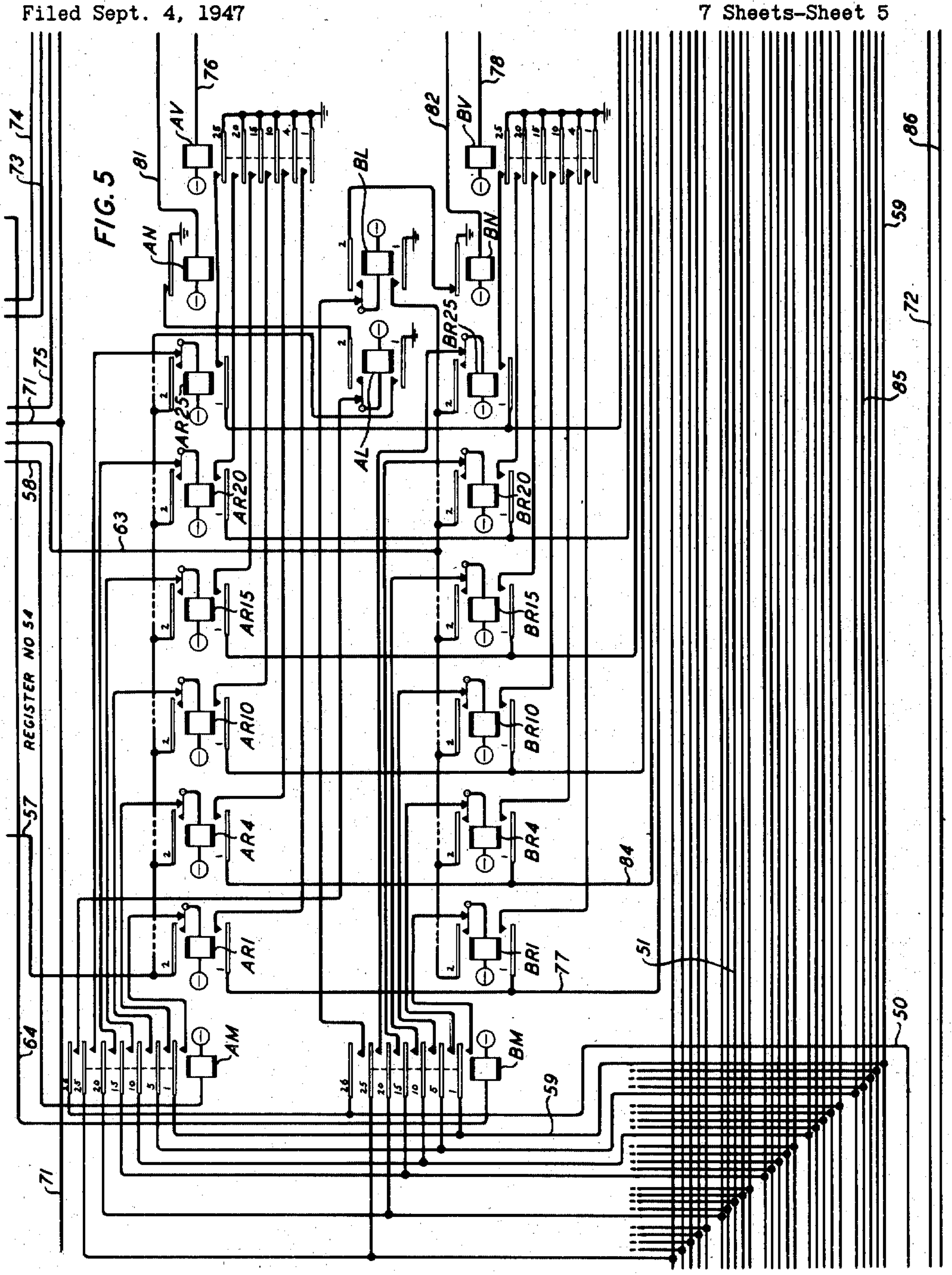
Fig. 5 shows the circuit of one register.
Figure 6:
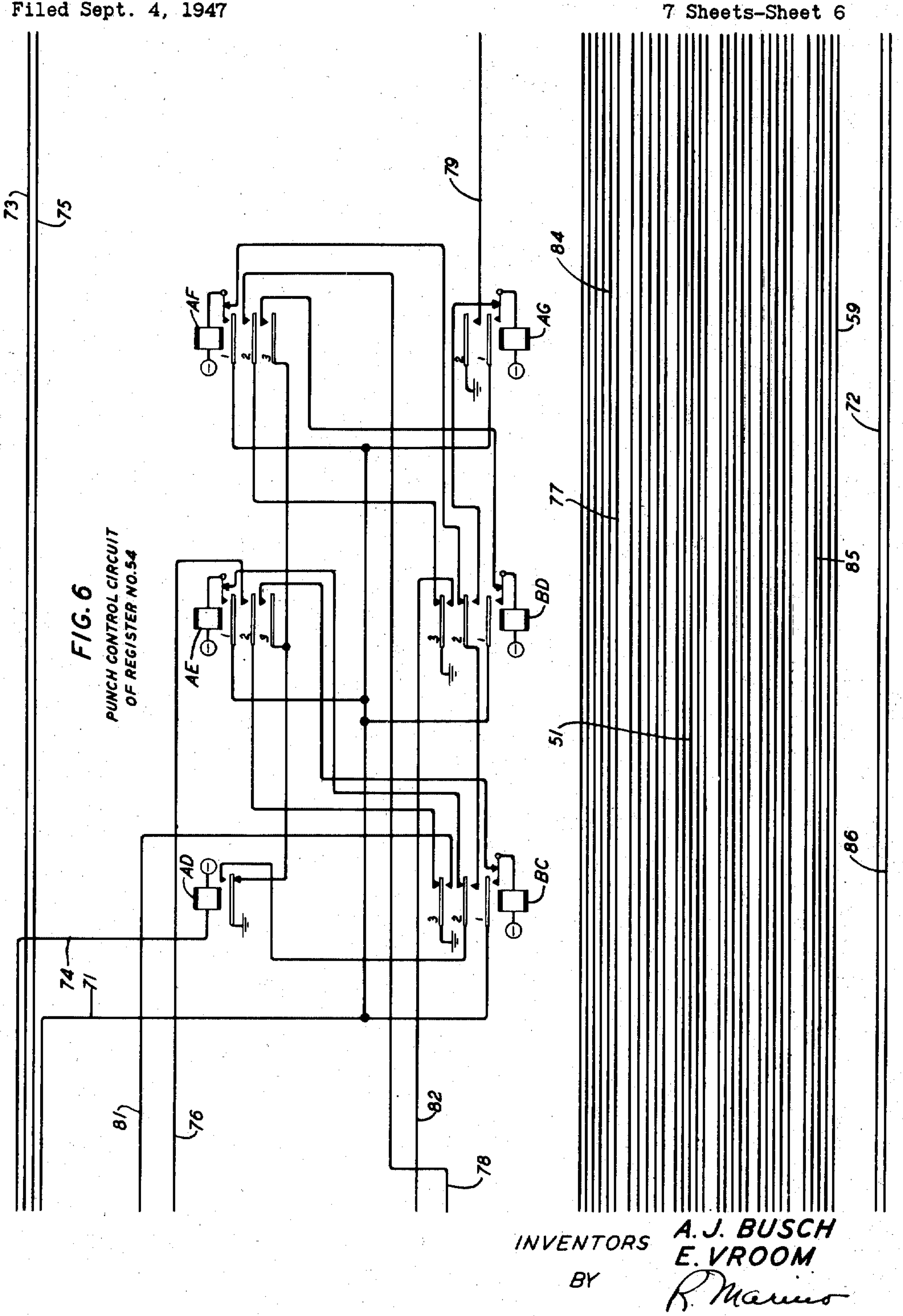
Fig. 6 shows the punch control circuit of one register.

In the present embodiment of the invention, one register comprising a register circuit and associated control circuit and punch control circuit is provided for each trunk number which may appear in the entries on the record tape T. Figs. 4, 5 and 6 show, respectively, the control circuit, the register circuit, and the punch control circuit provided for trunk number 54. Other registers, two of which are indicated in Fig. 4, provided for other trunk numbers, are similar to the register shown. In the operation of the system, when the first entry of a call is encountered by the sensing fingers of the reader R, one of the registers is selected in accordance with the trunk number contained in said entry and the contents of said entry are registered in said register. When the second entry relating to said call is encountered by the sensing fingers of reader R, the same register is again selected and the contents of said second entry also registered in said register. When the third entry relating to the same call is encountered, the same register is again selected and the information registered therein, together with the contents of the third entry, are then recorded on a card by the card punch CP, thereby assembling the three entries relating to said call.

For a clear understanding of the invention, we will now describe the assembling and recording of the entries shown on tape T in Fig. 1.

The tape T is run through the reader R in the direction shown by the arrow in Fig. 1, which is the opposite direction from that used in recording the entries on said tape. The first entry of a call encountered by the sensing fingers of reader R is, therefore, the last entry relating to said call recorded on tape T and the first line of the initial entry relating to said call encountered by the sensing fingers of reader R is the last line of said entry recorded and contains the trunk number. Assuming that the sensing fingers of reader R fall on line No. 9 of tape T, the No. 2 sensing finger falls into a depression closing its contacts, and circuits are thereby completed from battery through the winding of relay B, conductor 50, and No. 2 contacts of the reader R to ground, over which relay B operates. Sensing fingers Nos. 21, 22, 25 and 28 of reader R also encounter depressions in the tape T and close their contacts. Relays T3, T4, U2 and U5 are thereby operated. The circuit of relay T3 extends from battery through the winding of said relay, conductor 51, and contacts of No. 21 sensing finger to ground. The circuits of relays T4, U2 and U5 may be readily traced over similar paths. By the operation of relays T3 and T4, a circuit is completed from battery through the winding of relay TG5, conductor 53, No. 2 contacts of relay T4, and No. 1 contacts of relay T3 to ground, over which relay TG5 operates, completing a circuit from battery through the winding of relay AX, conductor 54, No. 6 contacts of relay TG5, conductor 55, No. 3 contacts of relay U5, No. 1 contacts of relay U2, conductor 56, and No. 1 contacts of relay B to ground, operating relay AX. Register No. 54, which is the register associated with trunk number 54 is thereby selected in accordance with said trunk number appearing in the entry of line No. 9 of the record on tape T.

Relay AA of said register thereupon operates over a circuit extending from battery through the winding and No. 1 normal contacts of said relay, No. 3 back contacts of relay BA, and No. 2 front contacts of relay AX to ground, and locks up through No. 1 contacts of relay AX to ground.

Relay AM operates over a circuit extending from battery through the winding of said relay, conductor 58, No. 3 contacts of relay AA, and No. 2 contacts of relay BA to ground, connecting the register relays AR1 . . . AR25 to the sensing-finger contacts of the reader R. The Nos. 4, 7, 10, 11, 14, 17, 21, 22, 25 and 28 sensing fingers of the reader encountering depressions in line No. 9 of the record tape T, the contacts of said fingers are closed, operating relays AR1, AR4, AR7, AR8, AR11, AR14, AR18, AR19, AR22, and AR25 (relays AR1, AR4, and AR25 only, being shown). For example, relay AR1 operates over a circuit extending from battery through the winding and No. 2 normal contacts of said relay, No. 1 contacts of relay AN, conductor 59, and No. 4 contacts of reader R to ground. The other relays named above operate over similar circuits. Relay AL operates over a circuit extending from battery through the winding and No. 2 normal contacts of said relay, No. 26 contacts of relay AM, conductor 59, and No. 2 contacts of reader R to ground, and locks up through its No. 2 front contacts and contacts of relay AN to ground. The operated register relays are then locked up through their No. 2 front contacts and No. 1 contacts of relay AL to ground and relay AA receives an additional locking circuit to the same ground through its No. 1 front contacts and conductor 57. The combination of register relays thus operated corresponds to the depressions in line No. 9 of tape T representing the digits "17154," thereby registering said digits.

When the mechanism of the reader R controlled by motor M lifts the sensing fingers of said reader, the contacts closed by said fingers are opened and relays B, T3, T4, U2 and U5 thereby released, releasing relay TG5 and, in turn, relay AX. Relay BA then operates over a circuit extending from battery through the winding and No. 1 normal contacts of said relay, No. 2 contacts of relay AA, back contacts of relay AX to ground and locks up over conductor 57. Relay BA opens the circuit of and releases relay AM.

The tape T is now drawn forward by the mechanism operated by motor M and the sensing fingers fall on line No. 8 of the record. Sensing finger No. 2, encountering a depression in tape T, closes its contacts and relay B reoperates over the circuit previously traced. Sensing fingers Nos. 19, 21, 27 and 28 also encountering depressions in tape T, relaye T1, T3, U4 and U5 operate in the manner previously described for relays T3, T4, U2 and U5 in connection with line No. 9 of the record.

Relay TG6 operates over a circuit extending from battery through the winding of said relay, conductor 60, No. 2 contacts of relay T3, and contacts of relay T1 to ground. Conductor 61 to register No. 63 is thereby grounded through No. 7 contacts of relay TG6, No. 1 contacts of relays U4 and U5, conductor 56, and No. 1 contacts of relay B to ground, causing the operation of the relay in register No. 63 corresponding to relay AX in register No. 54. Register No. 63 is thereby selected in accordance with the trunk number 63 which appears as the last two digits of line No. 8 of the record T. The operation of register No. 63 is similar to that described above for register No. 54 and the digits "15763" recorded in line No. 8 of the record T are registered in register No. 63 by the relays in said register corresponding to relays AR1 . . . AR25. When the sensing fingers of reader R are again lifted, the circuits of relays B, T1, T3, U4, U5, and TG6 are opened and said relays released.

The tape T is now drawn forward by the mechanism operated by motor M and the sensing fingers of the reader fall on line No. 7 of the record. Sensing finger No. 2 encountering a depression in tape T closes its contacts and relay B again operates over the circuit previously traced. Sensing fingers No. 21, 22, 25 and 28 also encountering depressions in tape T also close their contacts, operating relays T3, T4, U2, U5 and TG5 as previously described. Relay AX then reoperates over the circuit previously traced, thereby again selecting register No. 54.

Relay AB now operates over a circuit extending from battery through the winding and No. 1 normal contacts of said relay, No. 3 back contacts of relay BB, No. 3 front contacts of relay BA, and No. 2 front contacts of relay AX to ground. Relay BM operates over a circuit extending from battery through the winding of said relay conductor 64, No. 3 contacts of relay AB, and No. 2 contacts of relay BB to ground, connecting the register relays BR1 . . . BR25 to the contacts of the reader R. Sensing fingers No. 4, 7, 10, 13, 14, 18, 21, 22, 25 and 28 of the reader, encountering depressions in tape T, close their contacts, thereby operating relays BR1, BR4, BR7, BR10, BR11, BR15, BR18, BR19, BR22, and BR25 (relays BR1, BR4, BR15 and BR25 only, being shown). For example, relay BR15 operates over a circuit extending from battery through the winding and No. 2 normal contacts of said relay, No. 15 contacts of relay BM, conductor 65, and No. 18 contacts of reader R to ground. The other register relays named above operate over similar circuits. Relay BL operates over a circuit extending from battery through the winding and No. 2 normal contacts of said relay, No. 26 contacts of relay BM, conductor 58, and No. 2 contacts of reader R to ground, and locks up through its No. 2 front contacts and contacts of relay BN to ground. The operated register relays are now locked up through their No. 2 front contacts and No. 1 contacts of relay BL to ground, and relay AB is locked up to the same ground through its No. 1 front contacts and conductor 63. The register relays thus operated correspond to the depressions in line No. 7 of the record representing the digits "14954," thereby registering said digits.

The mechanism of the recorder operated by motor M then lifts the sensing fingers, opening their contacts and thereby releasing relays B, T3, T4, U2 and U5, which releases relay TG5 and, in turn, relay AX. Relay BB then operates over a circuit extending from battery through the winding and No. 1 normal contacts of said relay, No. 2 contacts of relay AB, back contacts of relay AX ground, and locks up through its No. 1 front contacts, conductor 63, and No. 1 contacts of relay BL to ground.

The tape T is then drawn forward by the mechanism operated by motor M and the sensing fingers fall on line No. 6 of the record. Sensing finger No. 2 encountering a depression in tape T closes its contacts, again operating relay B, as previously described. Sensing fingers Nos. 20, 21, 25 and 27 also encountering depressions in tape T also close their contacts, operating relays T2, T3, U2 and U4 over circuits similar to those already traced in connection with previous lines of the record. Relay TG7 then operates over a circuit extending from battery through the winding of said relay, conductor 66, No. 3 contacts of relay T3, and No. 1 contacts of relay T2 to ground. Conductor 67 to register No. 72 is thereby grounded through No. 8 contacts of relay TG7, conductor 68, No. 3 contacts of relay U4, No. 1 contacts of relay U2, conductor 56, and No. 1 contacts of relay B to ground, causing the operation of the relay in register No. 72 corresponding to relay AX, thereby selecting said register, which is the register assigned for the trunk number 72 recorded in line No. 6 of the record. Said register operates in a manner similar to that already described for register No. 54 to register the digits "14672" recorded in line No. 6 of the record.

When the tape T is again moved by the mechanism operated by motor M and the sensing fingers fall on line No. 5 of the record, sensing finger No. 3 encountering a depression in said tape, closes its contacts. Relay C then operates over a circuit extending from battery through the winding of said relay, conductor 69, and No. 3 contacts of reader R to ground. Sensing fingers No. 21, 22, 25, and 28 encountering depressions in tape T, close their contacts and relays T3, T4, U2, and U5 operate, as previously described. The operation of relays T3, T4, U2 and U5 causes the reselection of register No. 54 and the operation of relay AX in the manner previously described.

Relay AC then operates over a circuit extending from battery through the winding and No. 1 normal contacts of said relay, No. 3 front contacts of relay BB, No. 3 front contacts of relay BA, and No. 2 front contacts of relay AX, to ground and locks up through its No. 1 contacts, conductor 71, No. 2 contacts of relay B and No. 1 contacts of relay A6 to ground, completing a circuit from battery through the winding of the arresting magnet MA, conductor 72, No. 27 normal contacts of relay PMC, conductor 73, and No. 3 contacts of relay AC to ground, over which the arresting magnet MA operates, arresting further advance of tape T. Relay PST also operates over a circuit extending from battery through the winding of said relay to the above-traced ground on conductor 73 and locks up through its No. 3 contacts and contacts C3, now closed by cam C1, to ground. The No. 1 contacts of relay PST complete the circuit of the motor M1 of the card punch CP, starting a cycle of operations of said card punch. When said card punch is in condition to punch the first line of a card, contacts C2 are closed and a circuit is completed from battery through the winding of relay AD, conductor 74, No. 2 contacts of relay AC, conductor 75, No. 26 contacts of relay PMC, No. 2 contacts of relay PST, and contacts C2 to ground, over which relay AD operates. Relay AE operates over a circuit extending from battery through the winding and No. 1 normal contacts of said relay, No. 2 back contacts of relay BC, and front contacts of relay AD to ground, and locks up through its No. 1 front contacts, conductor 71, No. 2 contacts of relay B, and No. 1 contacts of relay A6 to ground, completing a circuit from battery through the winding of relay AV, conductor 76, No. 2 contacts of relay AE, and No. 3 contacts of relay BC to ground, over which relay AV operates. A combination of conductors to the card punch CP is now grounded which corresponds to the digits "17154" recorded in line No. 9 of the record T and registered by relays AR1 . . . AR25, as described above. For example, conductor 80 is grounded through No.

1 back contacts of relay PMC, conductor 77, No. 1 contacts of relay AR1, and No. 1 contacts of relay AV to ground and conductor 83 is grounded through No. 4 back contacts of relay PMC, conductor 84, No. 1 contacts of relay AR4, and No. 4 contacts of relay AV to ground. This combination of conductors corresponds to the depressions in tape T for the second digit of line No. 9 which is "1." The entire combination of conductors so grounded operates a corresponding combination of selector magnets of the card punch CP, causing the punching of holes in the first line of the card in said punch which have the same relative arrangement as the depressions in line No. 9 of the tape T, thus recording on said card the digits "17154."

When the card punch CP has punched the first line, cam C opens contacts C2, opening the circuit of and releasing relay AD. Relay BC then operates over a circuit extending from battery through the winding and No. 1 normal contacts of said relay, No. 3 contacts of relay AE, and back contacts of relay AD to ground, and locks up through its No. 1 front contacts, conductor 71, No. 2 contacts of relay B, and No. 1 contacts of relay A6 to ground. By the operation of relay BC, the circuit of relay AV is opened at No. 3 back contacts of relay BC, releasing relay AV, which opens the circuits of the conductors to the card punch CP. Relay AN operates over a circuit extending from battery through the winding of said relay, conductor 81, and No. 3 front contacts of relay BC to ground, opening the locking circuit of relay AL which releases and opens the locking circuits of relays AA, BA and those of relays AR1 . . . AR25 locked up, releasing said relays.

When the card punch CP is ready to punch a new line, cam C closes contacts C2. Relay AD now reoperates over the circuit previously traced for the operation of said relay, and relay AF then operates over a circuit extending from battery through the winding and No. 1 normal contacts of said relay, No. 2 back contacts of relay BD, No. 2 front contacts of relay BC, and front contacts of relay AD to ground and locks up through its No 1 front contacts, conductor 71, No. 2 contacts of relay B, and No. 1 contacts of relay A6 to ground, completing a circuit from battery through the winding of relay BV, conductor 78, No. 2 contacts of relay AF, and No. 3 back contacts of relay BD to ground, over which relay BV operates. A combination of conductors to card punch CP is now grounded which corresponds to the digits "14954" of line No. 7 of the record, registered by relays BR1 . . . BR25, as previously described. For example, conductor 80 is grounded through No. 1 back contacts of relay PMC, conductor 77, No. 1 contacts of relay BR1, and No. 1 contacts of relay BV to ground, and conductor 83 is grounded through No. 4 back contacts of relay PMC, conductor 84, No. 1 contacts of relay BR4, and No. 4 contacts of relay BV to ground. These conductors correspond to the depressions in tape T for the second digit of line No. 7 which is "1." The other conductors similarly grounded correspond to the depressions in the remainder of line No. 7 of tape T. The conductors thus grounded cause the operation of corresponding selector magnets in card punch CP, which thereupon punches a line of holes corresponding to the digits "14954."

When cam C opens contacts C2, the circuit of relay AD is thereby opened and said relay released. Relay BD then operates over a circuit extending from battery through the winding and No. 1 normal contacts of said relay, No. 3 contacts of relay AF, and back contacts of relay AD to ground, and locks up through its No. 1 front contacts, conductor 71, No. 2 contacts of relay B, and No. 1 contacts of relay A6 to ground. The No. 3 back contacts of relay BD open the circuit of and release relay BV, which removes ground from the conductors to the card punch CP. Relay BN operates over a circuit extending from battery through the winding of said relay, conductor 82, and No. 3 front contacts of relay BD to ground, opening the locking circuit of relay BL which releases to open the locking circuits of relays AB, BB, and those of relays BR1 ... BR25 locked up, releasing said relays. When the mechanism of the card punch CP has advanced to the position for punching the third line, cam C closes contacts C2 and relay AD reoperates over the circuit previously traced for said relay. Relay AG operates over a circuit extending from battery through the winding and No. 1 normal contacts of said relay, No. 2 front contacts of relay BD, No. 2 front contacts of relay BC, and front contacts of relay AD to ground, and locks up through its No. 1 front contacts, conductor 71, No. 2 contacts of relay B, and No. 1 contacts of relay A6 to ground. Relay PMC operates over a circuit extending from battery through the winding of said relay, conductor 79, and No. 2 contacts of relay AG to ground. By the operation of relay PMC, the circuit of relay AD, previously traced, is opened at No. 26 contacts of relay PMC and relay AD releases. The circuit of arresting magnet MA is maintained through No. 27 front contacts of relay PMC and contacts C2 to ground. During the punching of the first three lines of the card in the card punch CP, the operated arresting magnet MA prevents the tape T from being advanced, the sensing fingers continuing to fall on line No. 5 of the record on said tape.

When the sensing fingers now again fall on line No. 5 of the record, sensing fingers Nos. 7, 8, 9, 13, 14, 15, 21, 22, 25 and 28 encountering depressions in tape T, the contacts associated with said fingers are closed. A combination of conductors to card punch CP is thereby grounded which corresponds to the digits "39054" recorded in line No. 5 of the record. For example, conductor 83 is grounded through No. 4 front contacts of relay PMC, conductor 85, and contacts of No. 7 sensing finger of reader R to ground. Other conductors are grounded over similar circuits. The conductors grounded cause the operation of corresponding selector magnets in the card punch CP, resulting in the punching of a line of holes corresponding to the digits "39054" in line No. 5 of the record.

When the sensing fingers are raised, the associated contacts open, removing ground from the conductors to the card punch CP. When cam C opens contacts C2, the circuit of the arresting magnet MA is thereby opened and said magnet released. Tape T is thereupon advanced by motor M so that when the sensing fingers of reader R again fall, they fall on line No. 4 of the record.

Sensing finger No. 1 encountering a depression in said tape, closes its associated contacts, operating relay A over an obvious circuit. Relay A1 operates over a circuit extending from battery through the winding and No. 1 normal contacts of said relay, No. 2 back contacts of relay A4, and front contacts of relay A to ground, and locks up through its No. 1 front contacts, conductor 86, and No. 28 contacts of relay PMC to ground. Sensing fingers Nos. 4, 7, 10, 13, 15, 17, 20, 23, 24 and 28 encountering depressions in tape T, the contacts associated with said fingers are closed and a combination of conductors to card punch CP corresponding to the digits "14249" recorded in line No. 4 of the record is grounded, causing said card punch to punch a corresponding line of holes in the card.

When the sensing fingers are lifted, the associated contacts are opened, removing ground from the conductors to the card punch CP. The circuit of relay A is also opened and said relay released. Relay A4 then operates over a circuit extending from battery through the winding and No. 1 normal contacts of said relay, No. 2 contacts of relay A1, and back contacts of relay A to ground and locks up through its No. 1 front contacts, conductor 86, and No. 28 contacts of relay PMC to ground.

Tape T is again advanced by motor M and the sensing fingers of reader R fall on line No. 3 of the record. Sensing finger No. 1 encountering a depression in tape T closes its contacts, reoperating relay A. Relay A2 operates over a circuit extending from battery through the winding and No. 1 normal contacts of said relay, No. 2 back contacts of relay A5, No. 2 front contacts of relay A4, and front contacts of relay A to ground and locks up through its No. 1 front contacts, conductor 86, and No. 28 contacts of relay PMC to ground. Other sensing fingers encountering depressions in tape T, close their contacts, grounding a combination of conductors to card punch CP corresponding to the digits "00226" recorded in line No. 3 of the record, causing said card punch to punch CP a corresponding line of holes in the card.

When the sensing fingers are lifted, the associated contacts are opened, removing ground from the conductors to the card punch CP. The circuit of relay A is also opened, releasing said relay, and relay A5 operates over a circuit extending from battery through the winding and No. 1 normal contacts of said relay, No. 2 contacts of relay A2, and back contacts of relay A to ground, and locks up through its No. 1 front contacts, conductor 86, and No. 28 contacts of relay PMC to ground.

Tape T is now advanced by motor M and the sensing fingers fall on line No. 2 of the record. Sensing finger No. 1 encountering a depression in tape T, relay A reoperates as described above, and relay A3 operates over a circuit extending from battery through the winding and No. 1 normal contacts of said relay, No. 3 contacts of relay A6, No. 2 front contacts of relay A5, No. 2 front contacts of relay A4, and front contacts of relay A to ground, and locks up through its No. 1 front contacts, conductor 86, and No. 28 contacts of relay PMC to ground. Other sensing fingers encountering depressions in tape T close their associated contacts, grounding a combination of conductors to card punch CP corresponding to the digits "79000" recorded in line No. 2 of the record, causing said card punch to punch a corresponding line of holes in the card.

When the sensing fingers are lifted, the associated contacts are opened, removing ground from the conductors to the card punch. The circuit of relay A is also opened and said relay released. Relay A6 then operates over a circuit extending from battery through the winding and No. 1 normal contacts of said relay, No. 2 contacts of relay A3, and back contacts of relay A to ground and locks up through its No. 1 front contacts, conductor 86, and No. 28 contacts of relay PMC to ground. The No. 1 contacts of relay A6 open the locking circuits of relays AC, AE, AF, BC, BD, and AG, releasing said relays. Release of relay AG opens the circuit of and releases relay PMC, which opens the locking circuits of and releases relays A1 . . . A6, restoring the circuits to normal.

When the card punch CP has completed its cycle of operations, ejecting the punched card, cam C1 opens contacts C3, opening the locking circuit of and releasing relay PST which, in turn, opens the circuit of motor M1, stopping the operation of the card punch.

The ejected card contains six lines of perforations duplicating the depressions in tape T for the second to the sixth digit of each of lines Nos. 2, 3, 4, 5, 7, and 9. These digits represent the pertinent information in regard to one telephone call made over trunk No. 54.

When the sensing fingers of reader R fall on line No. 1 of the record, sensing finger No. 3 encountering a depression in tape T, closes its contacts, operating relay C over an obvious circuit. The trunk number recorded in line No. 1 of the record being "54," register No. 54 is again selected and relays AX, AA, and AM operate as previously described. A combination of the register relays AR1 . . . AR25 is operated by the closed contacts of sensing fingers encountering depressions in line No. 1 of the record. However, relay AL is not operated (sensing finger No. 2 not having encountered an indentation in the record) so that no locking circuits are completed for any of the above relays, and when the sensing fingers are lifted, said relays all release. The fact that the first digit recorded in line No. 1 of the record is "3" indicates that said line forms part of the initial entry of a telephone call. No previous entry of the completion of said call having been encountered, the system does not record information in regard to that call for which, since it appears to have been incompleted, no charge should be made. Succeeding lines of the record produce the result described above for line No. 1 until a line is encountered in which the initial digit is "2." Then the operations are as described for line Nos. 6, 7, 8, or 9 of the record.

The foregoing description illustrates the application of the invention to the assembling of data from one form of embossed record. Other forms of record on which data is represented by punch holes, by magnetized spots, or by variations in transparency, and reading devices suitable for reading such records by mechanical, electrical, or photometric means are well known in the art. It is obvious that the invention is equally applicable to the assembling of data from records of the above or other forms in association with suitable reading devices whereby electrical circuits may be closed in accordance with the recorded data.

What is claimed is:

1. In a recording system, the combination of a record having related items of data recorded thereon, a reader responsive successively to each of said recorded items, a register responsive to said reader to register all of said items except the last, and a recorder responsive to said reader and to said register to record all of said related items.

2. In a recording system, the combination of a record having related items of data recorded thereon, a reader responsive to said record, a plurality of registers selectively responsive to said reader, means for selecting one of said registers in accordance with an item of said data to register said item, a recorder responsive to said reader and to said register, and means for operatively connecting said recorder with said reader and with said register in accordance with another item of said data to record both of said related items.

3. In a recording system, the combination of a record having related items of data recorded thereon, a reader responsive to said record, a plurality of registers selectively responsive to said reader, means for selecting one of said registers in accordance with a first item of said data to register said item, means for selecting said register in accordance with a second item of said data to register said item, a recorder responsive to said reader and to said register, and means for operatively connecting said recorder with said reader and with said register in accordance with a third item of said data to record both of said registered items and said third item.

4. In a recording system, the combination of a record having items of data recorded thereon in arbitrary sequence some of said items being related to each other and others of said items being unrelated, a reader successively responsive to said items of recorded data, a plurality of registers responsive to said reader, means for selecting one of said registers in accordance with each item encountered by said reader not related to a previously-encountered item to register said item, a recorder responsive to said reader and to said registers, and means for operatively connecting said recorder with said reader and with each of said registers successively to record successively each registered item and a related item.

5. In a recording system, the combination of a record having items of data recorded thereon in arbitrary sequence, some of said items being related to one another and others of said items being unrelated, a reader successively responsive to said items of recorded data, a plurality of registers responsive to said reader, means for selecting one of said registers in accordance with each item encountered by said reader not related to a previously-encountered item to register said item, means for selecting a register having an item registered therein when a second related item is encountered by said reader to register said second related item, a recorder responsive to said reader and to said registers, and means for selecting a register having two items registered therein when a third related item is encountered by said reader to record said two registered items and said third related item.

6. In a recording system, the combination of a record having items of data recorded thereon in arbitrary sequence, some of said items being related to one another and others of said items being unrelated, a reader successively responsive to said items of recorded data, a plurality of registers responsive to said reader, means for selecting one of said registers in accordance with each item encountered by said reader not related to a previously-encountered item to register said item, means for selecting each of said registers having an item registered therein when a related item is encountered by said reader to register said related item, a recorder responsive to said reader and to said register, and means for operatively connecting said recorder with said reader and successively with each of said registers having related items registered therein when the last related item is encountered by said reader to record said registered items and said last related item.

7. In a system for assembling related items of data recorded in arbitrary sequence, a record having items of data recorded thereon, a reader responsive to said record, means responsive to said reader for registering items of data, a recorder responsive to said reader and to said registering means for recording each group of related items of data on an individual card.

8. In a system for assembling related items of data recorded in arbitrary sequence, a record having items of data recorded by impressions therein, a reader responsive to the impressions of said record, means responsive to said reader for registering items of data, and means responsive to said reader and to said registering means for recording each group of related items of data on an individual card.

9. In a system for assembling related items of data recorded in arbitrary sequence, a record having items of data recorded by impressions therein, the relation of said items being indicated by impressions in each of said items, a reader responsive successively to the impressions of said items, a plurality of registers responsive to said reader to register said items, means controlled by the impressions in each of said items for selecting one of said registers, and means responsive to said reader and to said registers for recording each group of related items on an individual card.

10. In a system for assembling related items of data recorded in arbitrary sequence, a record having items of data recorded by impressions therein each item comprising one or more lines of impressions, a reader responsive successively to each of said lines of impressions, a plurality of registers responsive to said reader to register said items in accordance with impressions in said items, and means responsive to said reader and to said registers for recording consecutively all the lines comprising a group of related items.

ALOYSIUS J. BUSCH.
EDWARD VROOM.

REFERENCES CITED

The following references are of record in the file of this patent:

UNITED STATES PATENTS

| Number | Name | Date |
|---|---|---|
| 2,172,062 | Ghertman | Sept. 5, 1939 |
| 2,328,654 | Lake et al. | Sept. 7, 1943 |